United States Patent
Qi et al.

(10) Patent No.: US 8,675,131 B2
(45) Date of Patent: Mar. 18, 2014

(54) SIGNAL PROCESSING DEVICE AND TV WITH THE SIGNAL PROCESSING DEVICE

(75) Inventors: Hongtao Qi, Shangdong (CN); Wenqiang Zhao, Shangdong (CN); Yong Liu, Shangdong (CN); Yilong Chen, Shangdong (CN); Jianwei Guo, Shangdong (CN)

(73) Assignees: Haier Group Corporation (CN); Qingdao Haier Electronics Co., Ltd. (CN)

( * ) Notice: Subject to any disclaimer, the term of this patent is extended or adjusted under 35 U.S.C. 154(b) by 66 days.

(21) Appl. No.: 13/132,817

(22) PCT Filed: Aug. 17, 2009

(86) PCT No.: PCT/CN2009/073295
§ 371 (c)(1),
(2), (4) Date: Jun. 3, 2011

(87) PCT Pub. No.: WO2010/139134
PCT Pub. Date: Dec. 9, 2010

(65) Prior Publication Data
US 2011/0242430 A1      Oct. 6, 2011

(30) Foreign Application Priority Data
Jun. 1, 2009   (CN) .......................... 2009 1 0015760

(51) Int. Cl.
H04N 7/00       (2011.01)
H04N 5/64       (2006.01)

(52) U.S. Cl.
USPC ......................................... 348/552; 348/839

(58) Field of Classification Search
USPC .......... 348/552, 730, 839; 434/307 A, 307 R; 725/133, 141, 153; 361/679.32, 361/679.31; 710/36, 72, 73, 62; 463/40, 463/42–45
See application file for complete search history.

(56) References Cited

U.S. PATENT DOCUMENTS

| | | | |
|---|---|---|---|
| 5,703,996 A * | 12/1997 | Omura et al. | 386/350 |
| 5,796,913 A * | 8/1998 | Takada et al. | 386/206 |
| 5,929,941 A * | 7/1999 | Tsuchiya et al. | 348/706 |
| 6,022,223 A * | 2/2000 | Taniguchi et al. | 434/307 A |
| 6,321,383 B1 * | 11/2001 | Funahashi et al. | 725/92 |
| 6,599,194 B1 | 7/2003 | Smith et al. | |
| 6,769,989 B2 * | 8/2004 | Smith et al. | 463/41 |
| 6,964,610 B2 * | 11/2005 | Yamauchi et al. | 463/23 |

(Continued)

FOREIGN PATENT DOCUMENTS

| | | |
|---|---|---|
| CN | 1196556 | 10/1998 |
| CN | 2419769 | 2/2001 |

(Continued)

OTHER PUBLICATIONS

Supplementary European Search Report, dated Jan. 16, 2013.

Primary Examiner — Victor Kostak
(74) Attorney, Agent, or Firm — Amster, Rothstein Ebenstein LLP

(57) ABSTRACT

A signal source which is detachably and electrically connected with a TV is disclosed. The TV has a video output unit and an audio output unit. Driven by the TV, the signal source exchanges a media signal with the TV. The signal source includes an audio input interface which receives an audio signal from an external audio input unit, and a media storage unit which is used for storing the media signal.

8 Claims, 4 Drawing Sheets

(56) References Cited

U.S. PATENT DOCUMENTS

| | | | |
|---|---|---|---|
| 7,424,731 B1* | 9/2008 | Nathan et al. | 725/100 |
| 7,519,749 B1* | 4/2009 | Sivertsen | 710/73 |
| 2004/0165119 A1* | 8/2004 | Choi et al. | 348/839 |
| 2005/0105007 A1 | 5/2005 | Christian | |
| 2007/0059670 A1* | 3/2007 | Yates | 434/107 |
| 2007/0086280 A1* | 4/2007 | Cappello et al. | 369/30.06 |
| 2007/0120975 A1 | 5/2007 | Tsai et al. | |
| 2007/0252920 A1* | 11/2007 | Chen et al. | 348/839 |
| 2008/0018653 A1* | 1/2008 | Liu | 345/520 |
| 2008/0038960 A1* | 2/2008 | Liu | 439/630 |
| 2009/0124387 A1* | 5/2009 | Perlman et al. | 463/42 |
| 2009/0183622 A1* | 7/2009 | Parash | 84/610 |
| 2009/0296001 A1* | 12/2009 | Chan | 348/725 |
| 2010/0007668 A1* | 1/2010 | Casparian et al. | 345/505 |

FOREIGN PATENT DOCUMENTS

| | | |
|---|---|---|
| CN | 1684506 | 10/2005 |
| CN | 2842925 | 11/2006 |
| CN | 101071623 | 11/2007 |
| CN | 201035993 | 3/2008 |

* cited by examiner

SIGNAL PROCESSING DEVICE AND TV WITH THE SIGNAL PROCESSING DEVICE

This application claims the priority of China Patent Application No. 200910015760.9 filed on Jun. 1, 2009 and entitled "Signal processing device and TV with the signal processing device", the disclosure of which is incorporated in its entirety by reference herein.

TECHNICAL FIELD

The present invention relates to a signal processing device and a TV with the signal processing device, and more particularly, to a signal processing device having the karaoke function and a TV with the signal processing device.

DESCRIPTION OF RELATED ART

Currently, what are widely used are mostly TVs that receive an analog signal. With the advent of digital TVs, digital signals are converted into analog signals mainly by using external apparatuses such as set-top boxes (STBs), digital video discs (DVDs) and digital video broadcastings (DVBs), and are then outputted to the TVs for display. For example, upon receiving a digital signal, an STB converts the digital signal into an A/V interface signal in the form of a standard video signal or Y, U or V interface signals in the form of analog component video signals, and outputs the converted analog signals with a low display resolution to a TV. As shown in FIG. 1, the TV interfaces with a DVD STB, a DVB STB and an IP TV STB via an A/V port respectively. However, with this architecture, each of the STBs requires a separate power source for supplying power thereto, and also requires a separate remote controller for respective control; moreover, signals outputted to the TV by such STBs are still analog images with a very low resolution. Meanwhile, due to the great variety of external apparatuses, many resources have to be provided repeatedly for these apparatuses. For example, each of the apparatuses requires a power source and a remote controller, and has a different number of output terminals with different colors. This leads to complex external connections, inconvenience in installation and use, and a large volume; and re-connection has to be made each time when a different apparatus is used. Furthermore, storing and operating multiple remote controllers represents inconvenience to users. When a new apparatus is added by a user, the apparatus must be provided with a complete set of accessories, and this increases the cost for the user; moreover, there is still no standard specification in terms of output of the individual apparatuses, and products of a same type have much different interfaces and performances.

On the other hand, some expensive high-end digital TVs have a high resolution e.g., a display mode of 1080P, 1080i or 720P, and external apparatuses have to be connected to these TVs via a great variety of interfaces such as a video graphics array (VGA) interface, a digital visual interface (DVI) or a high definition multimedia interface (HDMI). As the TV per se has a great variety of interfaces, external associated products such as STBs also have so many output modes that, even with output signals from the STBs, it is still often impossible to get an image with perfect quality on the high-end TV.

In the prior art, a combined TV in which a television STB is built in a TV has also been proposed. For example, China Patent No. 200520115859.3 discloses a recordable integrated IPTV in which an IPTV STB is built in an LCD TV. However, in the aforesaid combined TV, the IP TV STB is connected to a core circuit of the TV by using a different interface circuit. The different interfaces conform to different standards and don't allow for extension and upgrading, making it difficult to add a new digital program receiving source. Furthermore, different types of interfaces cause difficulty in upgrading the existing system, and even failure to allow for encrypted television reception in different areas and to satisfy information flow demands that may be different between individual areas and between individual operators. Integration of a specific function with a host machine may destroy the standardization of the host machine; meanwhile, the specific function may not be demanded by all the customers. Such machines are usually customized by a group of special customers for use in a specific place, but are not demanded popularly and thus cannot be popularized extensively. Due to inconsistent product specifications caused by the difference between combining modules of such combined TVs, it is difficult to realize the industrial standardization and to produce associated products in this industry, leading to a high manufacturing cost and non-standard associated products.

With development of the digitalization technology, currently, such processes as reading and decompression of audio signals and video signals in apparatuses such as television STBs are all completely digitalized, and the technical standard is normalized. For the digital audio-video standard of the digital TVs, the HDMIs have been popularized globally. Thus, directly transmitting a standard audio-video digital signal between these apparatuses and the digital TVs without transmitting an analog signal will become an irresistible trend.

Meanwhile, as the public pursues spirit entertainment, the users desire to achieve more and more entertainment functions including the karaoke function on the TV. However, at present, the karaoke function is mainly accomplished with the help of players like VCDs and DVDs to play contents of a CD, and the players must have independent host machines and independent power sources, resulting in a high use cost and waste of resources.

In order to overcome the shortcomings in the prior art, and in order to adapt the trend of continuous development of the digital television technology, it is necessary to provide a signal processing device, which conforms to the digital television standard, has a wide adaptation range, save resources and has the karaoke function, and a TV with the signal processing device.

BRIEF SUMMARY OF THE INVENTION

In view of the shortcomings in the prior art, the technical problem to be solved by the present invention is to provide a signal processing device, which conforms to the digital television standard and has a wide adaptation range, and a TV with the signal processing device.

To solve the aforesaid technical problem, the technical solution of the present invention is achieved as follows.

A signal processing device detachably and electrically connected to a TV, the TV comprising a video output unit and an audio output unit, and driven by the TV, the signal processing device exchanging a media signal with the TV, wherein: the signal processing device comprises an audio input interface for receiving an audio signal from an external audio input unit and a media storage unit for storing the media signal, and after being processed by the signal processing device, the audio signal and the media signal are transmitted to the video output unit and the audio output unit of the TV for output.

Further, the TV further comprises a power source device connected to the signal processing device to supply a voltage to the signal processing device.

The signal processing device further comprises a function extension module, which is electrically connected to the audio input interface to receive the audio signal inputted from the audio input interface.

The TV comprises a television system, which is electrically connected to the function extension module and exchanges the media signal and a communication control signal with the function extension module.

The audio input unit and the media storage unit input an audio-video signal to the television system unit through the function extension module.

The function extension module is connected to the television system through a gold finger linker, and the gold finger linker comprises a power signal terminal, a communication control signal terminal and an audio-video signal terminal.

Further, the signal processing device further comprises an external interface unit, which connects an input media signal to an external memory of the function extension module and connects an input video signal to a video input unit of the function extension module.

Further, the function extension module is further connected to a memory, and connects a download media file to a network interface of the memory.

The technical solution of the present invention can also be achieved as follows.

A TV comprising a video output unit, an audio output unit, and a signal processing device detachably connected to and driven by the TV, the signal processing device transmitting a media signal to the TV to extend functions of the TV, wherein: the signal processing device comprises an audio input interface for receiving an audio signal from an audio input unit and a media storage unit for storing the media signal, and after being processed by the signal processing device, the audio signal and the media signal are transmitted to the video output unit and the audio output unit of the TV for output.

Further, the TV further comprises a power source device connected to the signal processing device to supply a voltage to the signal processing device.

The signal processing device further comprises a function extension module, which is electrically connected to the audio input interface and drives the audio input interface.

The TV comprises a television system, which is electrically connected to the function extension module and exchanges the media signal and a communication control signal with the function extension module.

The audio input unit and the media storage unit input an audio-video signal to the television system unit through the function extension module.

The function extension module is connected to the television system through a gold finger linker, and the gold finger linker comprises a power signal terminal, a communication control signal terminal and an audio-video signal terminal.

Further, the signal processing device further comprises an external interface unit, which connects an input media signal to an external memory of the function extension module and connects an input video signal to a video input unit of the function extension module.

Further, the function extension module is further connected to a memory, and connects a download media file to a network interface of the memory.

Compared to the prior art, the present invention has the following benefits: because the signal processing device provided by embodiments of the present invention comprises an audio input interface capable of receiving an audio signal from an external audio input unit and a media storage unit capable of storing a media signal, it can receive or store various signals and allow a TV connected thereto to play various signals; and because the signal processing device conforms to the digital television standard, it has a wide adaptation range and can save resources. If the signal processing device receives or stores a karaoke program, then the TV connected to the signal processing device has the karaoke function, which is convenient for users.

DETAILED DESCRIPTION OF THE INVENTION

Figure 1:
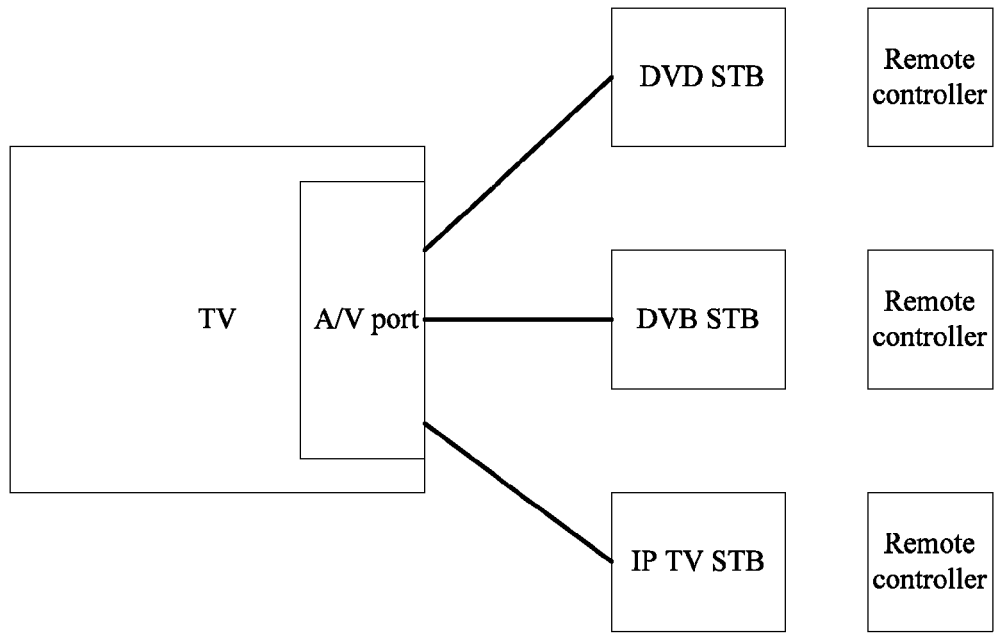
FIG. 1 is a schematic view of a receiving device of a conventional TV.

Now, embodiments of the present invention will be described in detail with reference to the attached drawings. Here, like reference numerals denote like elements throughout the drawings.

Figure 2:
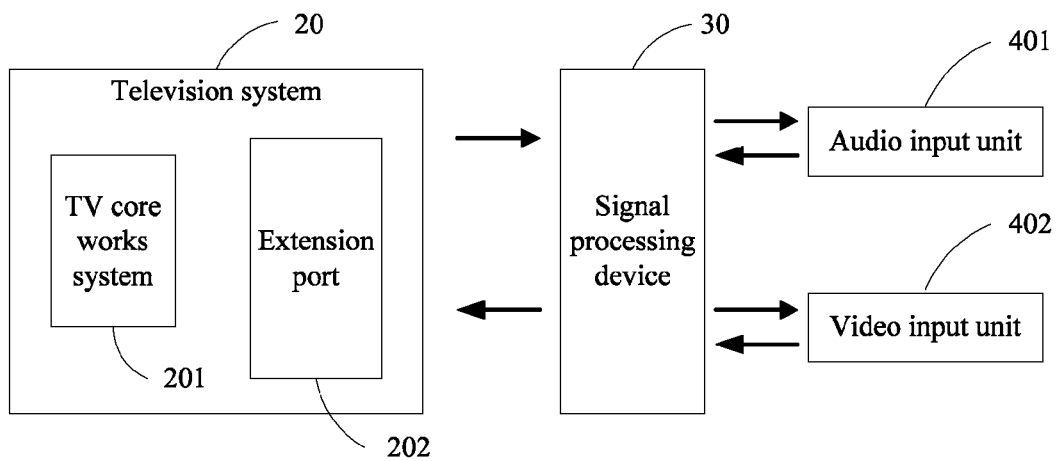
FIG. 2 is a structural block diagram of a TV and a signal input unit according to the most preferred embodiment of the present invention.

Referring to FIG. 2, there is shown a structural block diagram of a TV and an audio-video input unit according to the most preferred embodiment of the present invention. The TV comprises a television system 20 and a signal processing device 30. The television system 20 comprises a TV core works system 201 and an extension port 202. The extension port 202 is detachably connected to the external signal processing device 30. The signal processing device 30 can communicate with a signal input unit, which may be connected to the signal processing device 30 in a wired or wireless way. In the most preferred embodiment of the present invention, the signal input unit comprises an audio input unit 401 and a video input unit 402. The signal processing device 30 processes and then forwards to the television system 20 audio-video signals inputted by the audio input unit 401 and the video input unit 402 so that the television system 20 can play the audio-video signals. Of course, in other embodiments of the present invention, the signal input unit may not include the video input unit 402 so long as it can input an audio signal to achieve the karaoke function.

It is worth noting that, in the most preferred embodiment of the present invention, the signal processing device 30 may be in the form of an extension card, and the extension card may be an exposed circuit board with a user operation interface disposed on a side thereof (i.e., can have an external signal interface inserted therein) and a plug terminal disposed on another side thereof. The plug terminal corresponds to a plug port disposed on the extension port 202 of the TV. Thus, the plug port can engage with the plug terminal on the signal processing device 30 so that the signal processing device 30 can be plugged into or removed from the television system 20. In another embodiment of the present invention, the position of the plug terminal may be swapped with the position of the plug port; i.e., the plug port is disposed on the signal processing device 30, and the plug terminal is disposed within the extension port 202 of the television system 20 and is electrically connected to the TV core works system 201. Of course, other forms (e.g., an extension box) of the signal processing device 30 may also be known to those of ordinary skill in the art based on the disclosure of the present invention. The signal processing device 30 of the present invention may also be connected to the television system 20 via any other medi-device such as a signal adapter box or adapter plate; and the signal adapter box or adapter plate may also be provided with a plug port or a plug terminal matching with the plug terminal or the plug port of the television system 20.

Figure 3:
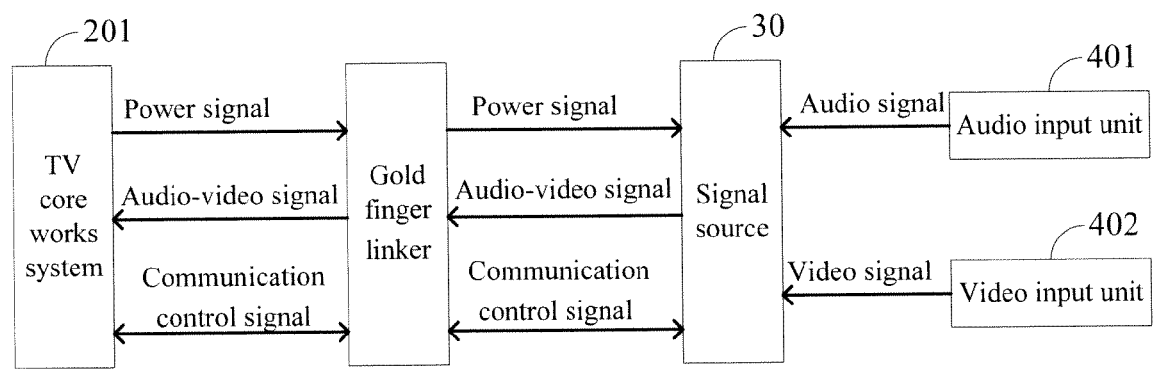
FIG. 3 is a schematic block diagram of a system according to the most preferred embodiment of the present invention.

As shown in FIG. 3, the preferred signal processing device 30 of the present invention is a signal processing device having the karaoke function. The signal processing device 30 may be externally connected to the audio input unit 401, and may also be externally connected to the video input unit 402 in addition to the audio input unit 401. The signal processing device 30 can receive and process the audio-video signals of the audio input unit 401 and of the video input unit 402, and forward the audio-video signals to the television system 20 for playing. Meanwhile, the television system 20 can further transmit a communication control signal to the signal processing device 30. In this way, the TV and the signal processing device 30 can be controlled in a uniform way, providing convenience for users.

In consideration of diversity of signal processing devices of digital TVs and to allow for an optimal display effect of the digital TVs and extendibility of the system, the signal processing device 30 of the present invention adopts the modularized design; i.e., the plug terminal and the plug port are made in the form of gold finger linkers. Through standardization of the design of the gold finger linkers in combination with the modularization of the signal processing device 30, convenient interfacing and flexible extension of the products can be achieved. Thus, the display standard of the digital TV source can be fully embodied, and the analog TVs can be transited into the digital TVs, with many functions being upgraded or new functions being added. Consumers can use the signal processing devices 30 having different functions in combination with the TV core works system 201 at a low and flexible cost simply by selecting and purchasing the signal processing devices 30 conforming to the standardized interface; and the signal processing device 30 can also be used separately. Owing to the flexible "modularized" configuration, the application scope of the products is also extended, and new technologies and new products can be added into a newly developed signal processing device module and thus added into the system for application. For the signal processing devices 30 having different functions, the gold finger linkers corresponding thereto have plug terminals and plug ports of a uniform specification. Here, the "specification" means not only that the plug terminals and the plug ports have the same arrangement in terms of their electrical signals, but also that the plug terminals and the plug ports have the same specification in terms of their physical sizes.

Signals transmitted by the gold finger linker according to the present invention at least include a power signal, the communication control signal and the audio-video signal. The plug terminal is disposed on the signal processing device 30, and may be a gold finger plug made of a printed circuit board. When the plug terminal is inserted into the plug port, conductive portions on the plug terminal and the plug port contact with each other to form an electrical connection so that the communication control signal, the audio-video signal and the power signal are transmitted between the signal processing device 30 and the TV core works system 201. The conductive portion of the plug terminal is plated with gold on a surface thereof, so it features good conductivity, anti-friction and anti-oxidation. As the power signal is included in the signals transmitted by the gold finger linker, the TV core works system 201 can provide a power source to the signal processing device 30 through the power signal; meanwhile, the signal processing device 30 and the TV core works system 201 can have a control information communication mechanism established therebetween by exchanging the communication control signal so as to operate coordinately, thereby transmitting the audio-video signal between the signal processing device 30 and the TV core works system 201. With this construction, the TV core works system 201 supplies power to the signal processing device 30, thus effectively saving power; and the signal processing device 30 and the TV core works system 201 control the information communication, thus effectively achieving convenient manipulation and satisfying demands of the users. Of course, the gold finger linker of the present invention may also be replaced with any other linking apparatus (e.g., a signal wire) so long as the linking apparatus can transmit the power signal, the communication control signal and the audio-video signal between the signal processing device 30 and the TV core works system 201.

The signal processing device 30 can be the extended functions of the TV, and performs data communication with the TV core works system 201. The signal processing device 30 may include module circuits having different functions, and thus can accomplish different functions, for example: a retrieving recordable module circuit that can play a high-definition video and can record a video, an entertainment game module circuit that can play a game, a digital television module circuit that can replace an STB to play a digital signal, a network download module circuit that can download a movie from a network, the module circuit having the karaoke function provided by the present invention, and the like. The TV supporting extension of the signal processing device 30 can accomplish different functions by exchanging the signal processing devices 30 having different functions.

Figure 4:
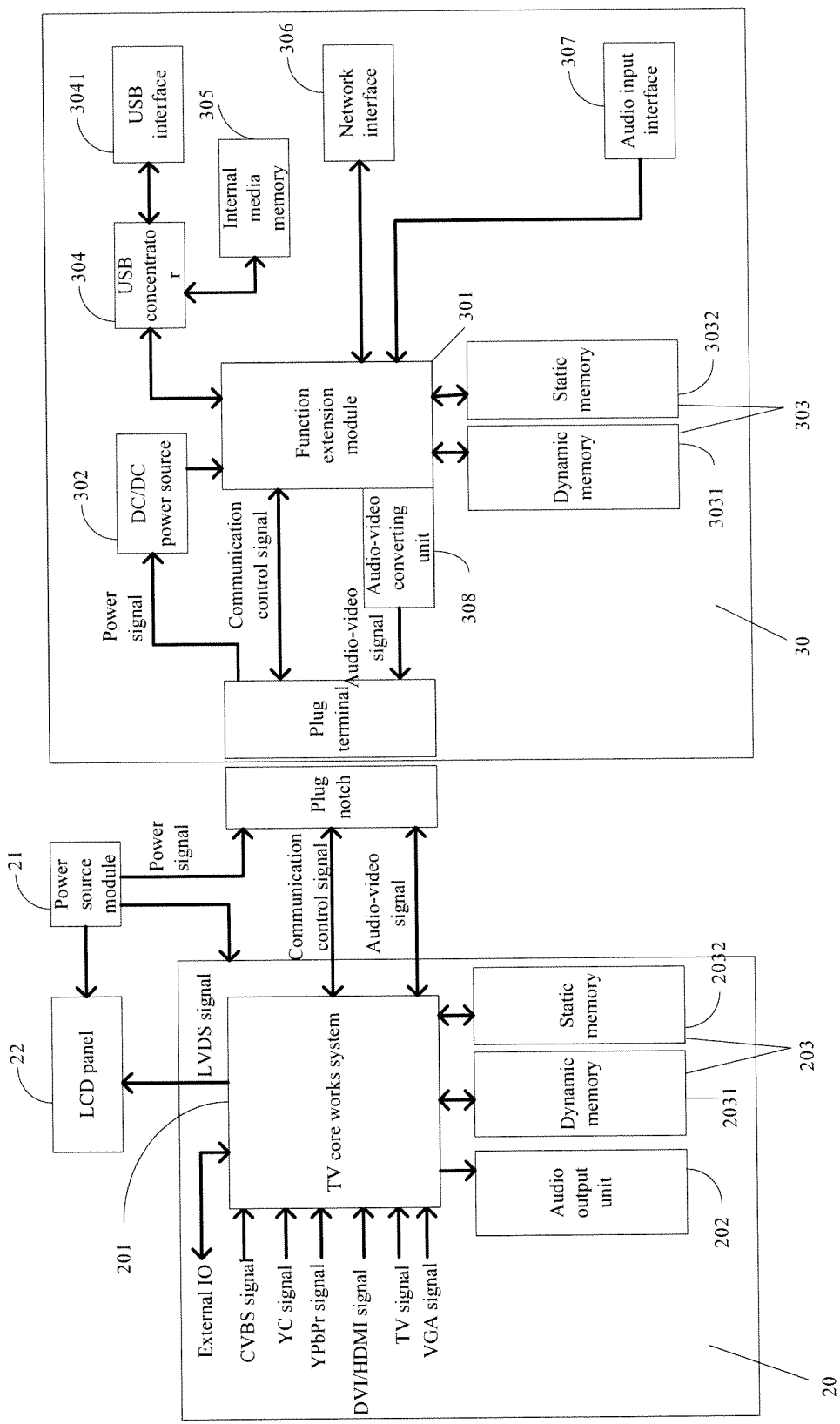
FIG. 4 is schematic block diagram of a circuit according to the most preferred embodiment of the present invention.

As shown in FIG. 4, the TV connected with the signal processing device 30 of the present invention comprises the television system 20, a power source module 21 and a liquid crystal display (LCD) panel 22. The power source module 21 is electrically connected to the television system 20 and the LCD panel 22 to supply a working voltage to the television system 20 and the LCD panel 22, and supplies a working voltage to the signal processing device 30 through the gold finger linker. Of course, the power source module 21 may also be integrated into the television system 20.

The television system 20, which is a mainboard of the TV, is disposed inside the TV and comprises such functional modules as the TV core works system 201, an audio output unit 202 and a memory 203. The TV core works system 201 includes therein multiple functional units such as a microprocessor, a graphic processor, a video processing unit, an audio processing unit, a demodulator, a decoder, a data communication bus and an IO interface. The TV core works system 201 can receive audio-video signals of different formats through various external interface units of the TV, and these signals may be analog signals or digital signals. These signals may include a receiving radio frequency (RF) signal, a composite video broadcast signal (CVBS), a luminance/chrominance (Y/C) signal, a color difference (Y/Pb/Pr) signal, a video graphics array (VGA) signal, a digital visual interface (DVI) signal, a high definition multimedia interface (HDMI) signal, and other existing audio-video signals. The TV core works system 201 processes and outputs the audio-video signals to the display panel and a sound apparatus of the TV.

The television system 20 is connected to and communicates with an external apparatus through the external IO interface, and the communication may be performed by using a general purpose IO interface (GPIO), pulse width modulation (PWM), a universal asynchronous receiver/transmitter (UART), infrared (IR), and the like. The television system 20 processes the received signals of different formats, converts the video signals into low voltage differential signaling (LVDS) signals for output to the LCD panel 22 to display an image, and outputs the audio signals to the audio output unit 202 to generate a sound.

The audio output unit 202 is configured to convert an audio signal in the form of an electrical signal into a sound signal in the form of air vibration, and may be such a device as a trumpet and a loudspeaker.

Serving as a data storage unit of the television system 20, the memory 203 can store the audio-video signal data and the communication control signal data. The memory 203 comprises a dynamic memory 2031 and a static memory 2032. The dynamic memory 2031, in which allocation is determined according to the demand, is generally used to store a formal parameter and an automatic variable of a function or data and instructions that are assigned during operation, and may be a dynamic random access memory (DRAM) such as a DDR and an SDR. The static memory 2032, in which allocation is fixed, is generally used to store a global variable or data and instructions that have not been compiled, and may be a flash.

The signal processing device 30 comprises a function extension module 301 disposed on a printed circuit board (PCB), a DC/DC power source 302, a memory 303, an internal media memory 305, an audio-video converting unit 308, and an external interface unit.

The function extension module 301, which is a core component of the signal processing device 30, can be electrically connected to and communicate with other elements, such as the memory 303, a USB concentrator 304, the internal media memory 305 connected to the USB concentrator, a network interface 306, an audio input interface 307, the audio-video converting unit 308 and an external interface and so on, thereby accomplishing a specific function of the TV jointly. The function extension module 301, comprising a processor and various functional units, receives and then processes and computes the communication control signal and the audio-video signal inputted by the plug terminal or a data signal inputted by the external interface unit, and feeds the processing result or data back to the television system 20 or outputs the processing result or data to an external apparatus or an external network connected to the external interface unit. The preferred function extension module 301 of the present invention can input the audio-video signal and the communication control signal to the television system 20 and receive the power signal provided by the television system 20. The function extension module 301 has the karaoke function, and has the audio input interface 307 externally connected to the audio input unit 401. The user can input an audio to the function extension module 301 through the audio input unit 401. Preferably, the function extension module 301 can further receive a video signal transmitted by the video input unit 402, which is decoded through the function extension module 301 and subjected to the DA (digital-analog) conversion through the audio-video converting unit 308 and is then inputted to the TV for playing.

Serving as a data storage unit of the function extension module 301, the memory 303 can store the audio-video signal data and the communication control signal data. The memory 303 comprises a dynamic memory 3031 and a static memory 3032. The dynamic memory 3031 may be a dynamic random access memory (DRAM) such as a DDR and an SDR. The static memory 3032 may be a flash.

The DC/DC power source 302 receives the power signal (e.g., 5 V or 12 V) that is inputted by the plug terminal and transmitted to the signal processing device 30 by the television system 20. Serving as a switch power source, the DC/DC power source 302 can boost or reduce the voltage of the inputted power signal and convert the power signal into a required fixed voltage for output to the function extension module 301, thereby providing a suitable working voltage. Of course, this is only a common circuit structure of the signal processing device 30, and the circuit structures of the signal processing devices 30 having different functions may be adjusted according to the function properties.

The external interface unit comprises a USB interface 3041 connected to and controlled by the USB concentrator 304, the network interface 306 and the like. The USB interface 3041 can be connected to the video input unit 402 and the external memory. The video input unit 402 may be a camera, a video camera or the like; and the external memory may be a USB disc, a mobile hard disc, a flash or the like. The network interface 306 can be connected to an external network, and may be a wired network interface comprising an RJ45 port or a wireless network interface so long as the interface can be connected to the external network. An external media signal or data signal can be transmitted to the function extension module 301 by all the interfaces externally connectable to a signal such as the USB interface 3041, the audio input interface 307 and the network interface 306. After being decoded by the function extension module 301, the signal is subjected to the DA (digital-analog) conversion through the audio-video converting unit 308 into a play format of the television system 20, and is then inputted into the TV for playing. The preferred preset format in the present invention is a moving pictures experts group (MPEG) format; however, the preset format is not merely limited to the MPEG format, and may also be any other audio-video format. Of course, the audio-video converting unit 308 may act as a separate device, or may be integrated into the function extension module 301 or the television system 20. In the present invention, providing the audio-video converting unit 308 within the signal processing device 30 is only the most preferred embodiment of the present invention, but is not limitative. It is worth noting that, the external interface unit may further be extended as needed by those of ordinary skill in the art so as to connect more varieties of external memories, for example, various types of other interfaces such as a network interface connected to various external networks such as a telephone network and an optical fiber network, an integrated device electronics (IDE) interface connected to a hard disc or a CD driver, an advanced technology attachment (ATA)/serial advanced technology attachment (SATA) interface, a mouse interface, a keyboard interface, a joystick interface or a microphone interface, which will not be further described herein.

The standardized signal processing device 30 of the present invention can have a wider application scope and become suitable for use by more manufacturers. Furthermore, the standard modularized design of the individual functional units or interfaces provides a flexible function configuration and a relatively low cost. When the product is designed, what is needed is just to assemble the individual functional units or interfaces according to the function requirements. In this way, there is sufficient room for addition and use of new functions, new modules and new interfaces in the future, and all preparations are made for linkage between future modules and the existing modules in terms of such aspects as interface specifications and software upgrading. In the future, new functional modules can be added directly simply by using the same interface specification and conforming to the uniform protocol standard In addition, the entire system software can be updated and upgraded through the USB interface, the network interface and the like.

In the most preferred embodiment of the present invention, three modes for ordering a song and a music video (MV) are included:

first, a built-in song ordering mode: a song or MV is prewritten into the internal media memory 305, and the user can select the song or MV stored in the internal media memory 305 through the controller of the TV;

second, a network song ordering mode: the user connects the network through the network interface, accesses a specified server on the network, and selects and downloads a favorite song or MV into the memory 303, which is then read from the memory 303 for playing, and the song or MV will be automatically erased from the memory 303 after the TV is powered off; and third, an external memory ordering mode: the user writes into the external memory a song or MV conforming to the standard of the signal processing device 30 and the television system 20 and connects the external memory to the signal processing device through the USB interface, and the signal processing device is controlled by the user to read the song or MV in the external memory.

Of course, no matter in which mode the song or MV is ordered, the media signal is inputted to and decoded by the function extension module 301, and is the d to the television system for playing, Preferably, the signal processing device 30 can further record a video through the video input unit 402 connected to the USB interface and store the video into the internal media memory 305 or the external memory; and the user can upload the video to a specified network server to share it with families and friends.

Figure 5:
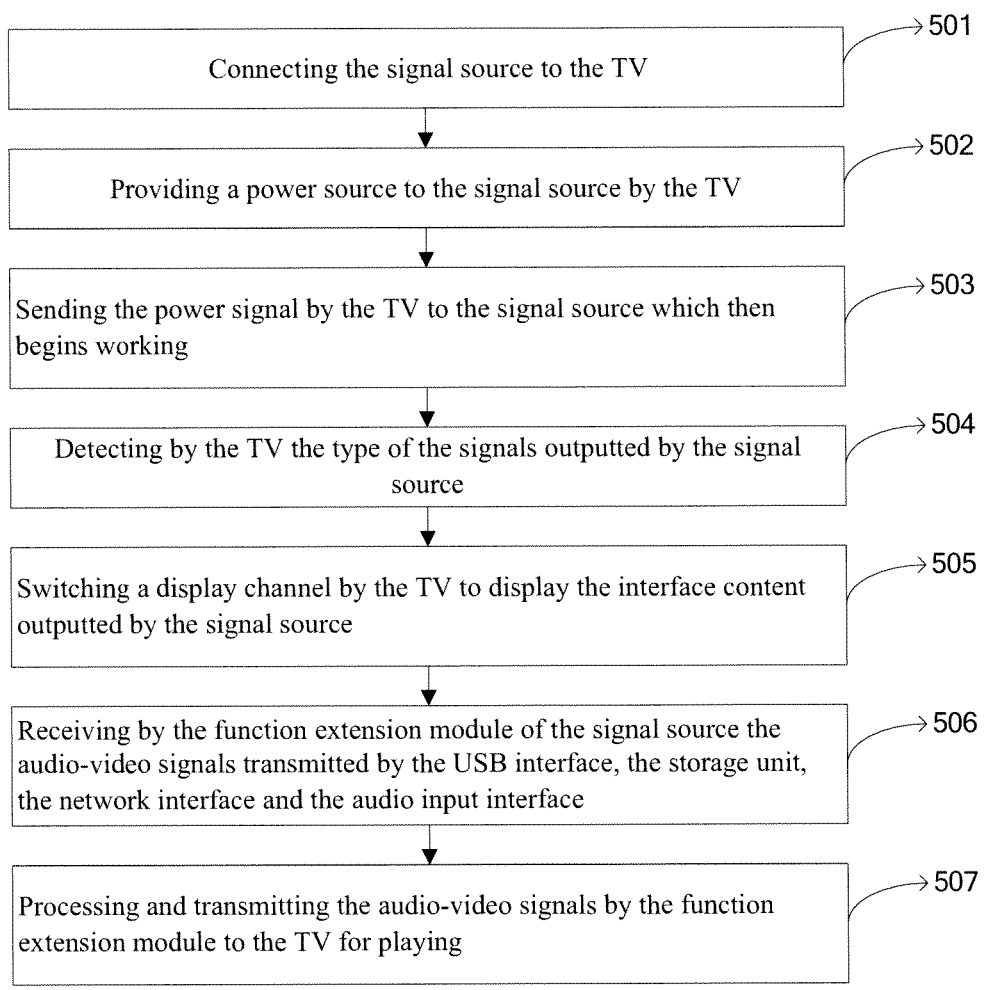
FIG. 5 is a flowchart of a method for a TV to operate a signal processing device according to the most preferred embodiment of the present invention.

FIG. 5 shows a flowchart of a method for a TV to operate a signal processing device according to the most preferred embodiment of the present invention. When the TV is connected to the signal processing device 30 through the television system 20 to be extended, the following can be known from the flowchart.

501. Firstly, the signal processing device 30 is connected to the TV directly or to the TV through the adapter box or adapter plate indirectly.

502. The TV provides a power source to the signal processing device 30 and the signal transceiver 305 connected to the signal processing device.

503. Apart from being connected to the TV, the signal processing device 30 is also connected to the television system 20 in the TV, the TV sends the power signal to the signal processing device 30 through the television system 20, and the signal processing device 30 begins working.

504. At this point, the television system 20 detects the externally connected apparatus and the type of the outputted signals; e.g., an identification signal can represent the signal processing devices 30 of different function types by using a set of binary codes. The signal processing device 30 outputs an audio-video type signal identification to a TV core works sub-system, and the audio-video type signal identification can use a set of binary codes to represent the type of signals that are inputted into the signal processing device by the external interface. These signals include an RF signal, a composite video broadcast signal (CVBS), a luminance/chrominance (Y/C) signal, a color difference (Y/Pb/Pr) signal, a video graphics array (VGA) signal, a digital visual interface (DVI) signal, a high definition multimedia interface (HDMI) signal and other existing audio-video signals.

505. Upon receiving the identification signal, the television system 20 switches a corresponding display channel 506. At this point, the function extension module 301 of the signal processing device receives the audio-video signals inputted from such external interfaces as the USB interface 3041, the network interface 306 and the audio input interface 307.

507. After the decoding and the DA conversion, the audio-video signals are transmitted to the television system 20 and played through the television system 20.

It is worth noting that, through mutual signal control and communication performed between the television system 20 and the signal processing device 30 in such communication manners as the UART/IIC/IR/COM, the TV can be controlled uniformly, which is convenient for the user.

Although the preferred embodiments of the present invention have been disclosed for purpose of illustration, it shall be appreciated by those of ordinary skill in the art that, various modifications, additions and replacements can be made without departing from the scope and the spirit of the present invention disclosed in the attached claims.

The invention claimed is:

1. Signal processing device detachably and electrically connected to a TV, the TV comprising a video output unit and an audio output unit, and driven by the TV, the signal processing device exchanging a media signal with the TV, wherein: the signal processing device comprises an audio input interface for receiving an audio signal from an external audio input unit and a media storage unit for storing the media signal, and after being processed by the signal processing device, the audio signal and the media signal are transmitted to the video output unit and the audio output unit of the TV for output;

the signal processing device further comprises a function extension module, which is electrically connected to the audio input interface to the audio signal inputted from the audio input interface;

the function extension module is connected to the television system through a gold finger linker, and the gold finger linker comprises a power signal terminal, communication control signal terminal and an audio-video signal terminal.

2. The signal processing device of claim 1, wherein the TV further comprises a power source device connected to the signal processing device to supply a voltage to the signal processing device.

3. The signal processing device of claim 1, wherein the TV comprises a television system, which is electrically connected to the function extension module and exchanges the media signal and a communication control signal with the function extension module.

4. The signal processing device of claim 1, wherein the signal processing device further comprises an external interface unit, which connects an input media signal to an external memory of the function extension module and connects an input video signal to a video input unit of the function extension module.

5. A TV, comprising a video output unit, an audio output unit, and a signal processing device detachably connected to and driven by the TV, the signal processing device transmitting a media signal to the TV to extend functions of the TV, wherein: the signal processing device comprises an audio input interface for receiving an audio signal from an external audio input unit and a media storage unit for storing the media signal, and after being processed by the signal processing device, the audio signal and the media signal are transmitted to the video output unit and the audio output unit of the TV for output;

the signal processing device further comprises a function extension module, which is electrically connected to the audio input interface to receive the audio signal inputted from the audio input interface;

the function extension module is connected to the television system through a gold finger linker; and the gold finger linker comprises a power signal terminal, a communication control signal terminal and an audio-video signal terminal.

6. The TV of claim 5, wherein the TV further comprises a power source device connected to the signal processing device to supply a voltage to the signal processing device.

7. The TV of claim 5, wherein the TV comprises a television system, which is electrically connected to the function extension module and exchanges the media signal and a communication control signal with the function extension module.

8. The TV of claim 5, wherein the signal processing device further comprises an external interface unit, which connects an input media signal to an external memory of the function extension module and connects an input video signal to a video input unit of the function extension module.

* * * * *